(12) United States Patent
Chuang

(10) Patent No.: US 6,466,374 B2
(45) Date of Patent: Oct. 15, 2002

(54) IRIDESCENT FILM WITH MULTIDIRECTIONAL VARIABLE OPTICAL STRIPES

(75) Inventor: H. L. Chuang, Tai-Shan Hsiang (TW)

(73) Assignee: Fong Teng Technology Co., Ltd. (TW)

( * ) Notice: Subject to any disclaimer, the term of this patent is extended or adjusted under 35 U.S.C. 154(b) by 0 days.

(21) Appl. No.: 09/903,550

(22) Filed: Jul. 13, 2001

(65) Prior Publication Data
US 2002/0076526 A1 Jun. 20, 2002

(30) Foreign Application Priority Data
Dec. 20, 2000 (TW) .................................. 89222137 U

(51) Int. Cl.$^7$ .......................... G02B 27/00; G02B 17/00
(52) U.S. Cl. ...................... 359/592; 559/596; 559/597; 559/609; 559/613
(58) Field of Search ................................ 359/591, 592, 359/593, 596, 597, 609, 613

(56) References Cited

U.S. PATENT DOCUMENTS

| | | | | |
|---|---|---|---|---|
| 5,123,722 A | * | 6/1992 | Meymand | 359/592 |
| 6,111,696 A | * | 8/2000 | Allen et al. | 359/495 |
| 6,239,911 B1 | * | 5/2001 | Koike et al. | 359/601 |
| 6,311,437 B1 | * | 11/2001 | Lorenz | 52/173.3 |

* cited by examiner

Primary Examiner—Christopher Mahoney
Assistant Examiner—Magda Cruz
(74) Attorney, Agent, or Firm—Troxell Law Office PLLC

(57) ABSTRACT

Iridescent film with multidirectional variable optical stripes, including multiple very thin laminated films. The films are respectively made of different transparent plastic materials with different refractive indices. At least one surface of the laminated films has numerous different stripes with different directions or pitches. When seen in different directions, the stripes of the iridescent film can reflect different colors and shapes of bright stripes. In addition, very fine bright colorful points are evenly distributed in the stripes to create a unique and tender vision.

7 Claims, 2 Drawing Sheets

IRIDESCENT FILM WITH MULTIDIRECTIONAL VARIABLE OPTICAL STRIPES

BACKGROUND OF THE INVENTION

The present invention is related to an iridescent film with multidirectional variable optical stripes.

Logic optical stripe embossing technique has been applied to the conventional tin foil painting. That is, an attachable aluminum foil is embossed with logic stripes. The stripes embossed on the surface of the aluminum foil have different reflection angles so that the picture is variable in different observation angles so as to achieve a unique optical stripe decoration effect. This is achieved in the following manner: As shown in FIG. 1, the aluminum foil 10 is embossed with several circles of optical stripes. For example, the Fines in the first circle 1 are straight lines. The lines in the second circle 2 are 30° different from those in the first circle. The lines in the third circle 3 are further 30° different from those in the second circle 2. The lines in the fourth circle 4 are further 30° different from those in the third circle 3. As shown in FIG. 2, when seeing such picture at a certain angle, only one circle can be seen, while the others cannot be seen. When the angle is varied, another circle can be seen. Accordingly, when the angle is continuously varied, the picture will be continuously moved. In the case that the difference in angle between the circles is smaller, for example, within 5°–10°, the variation will be more apparent.

Without using any color and dye, a conventional iridescent film, such as a kind of plastic film manufactured by Mearl Company of U.S., is able to reflect different colors and shapes of stripes varied with the observation angle. However, the created optical stripes are plane light reflected by a simple plane surface so that the stripes have monotonous color.

SUMMARY OF THE INVENTION

It is therefore a primary object of the present invention to provide an iridescent film with multidirectional variable optical stripes. The iridescent film includes multiple very thin laminated films. The films are respectively made of different transparent plastic materials with different refractive indices. At least one surface of the laminated films has numerous different stripes with different directions or pitches. When seen in different directions, the stripes of the iridescent film can reflect different colors and shapes of bright stripes.

The present invention can be best understood through the following description and accompanying drawings wherein:

DETAILED DESCRIPTION OF THE PREFERRED EMBODIMENTS

Please refer to FIGS. 1 to 5. The iridescent film of the present invention is manufactured in the following method:

A film with necessary picture is first made in computer plate-making method. Then an embossed plate is made by way of engraving. Alternatively, an embossed roller 31 can be directly made. The iridescent film can be solely formed by various kinds of embossing machines. Alternatively, the iridescent film can be attached to other backing materials 21 (such as attachable paper, PP sheet or film, PE sheet or film, PVC, PET, PS sheet or film, etc.) and embossed by the embossing machines.

Figure 1:
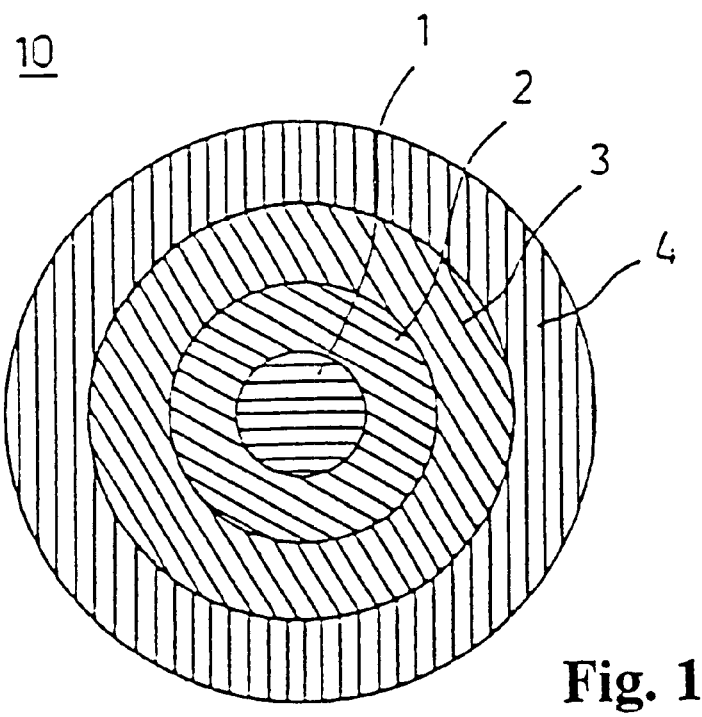
FIG. 1 is a front view of an attachable tin foil embossed with logic optical stripes.
Figure 2:
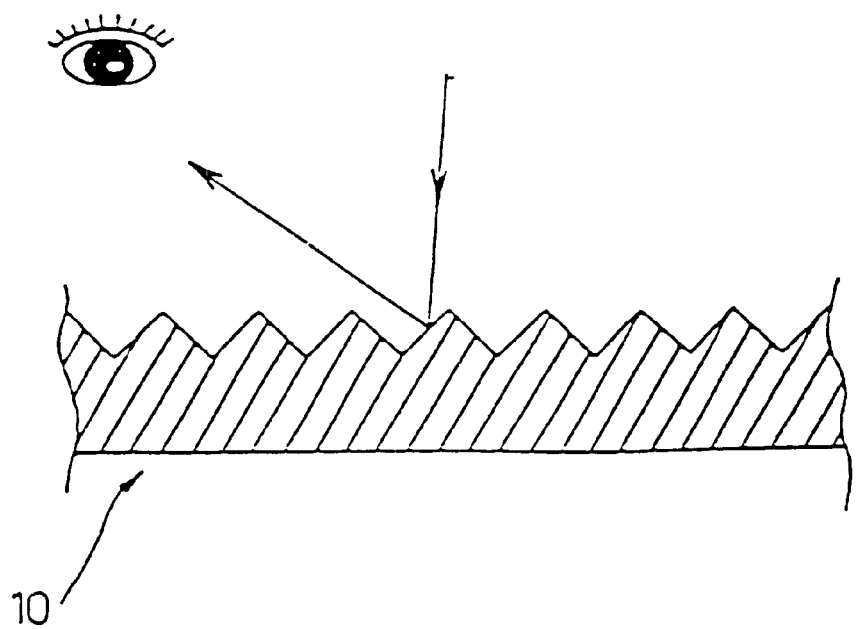
FIG. 2 is a cross-sectional view of the tin foil of FIG. 1.
Figure 3:
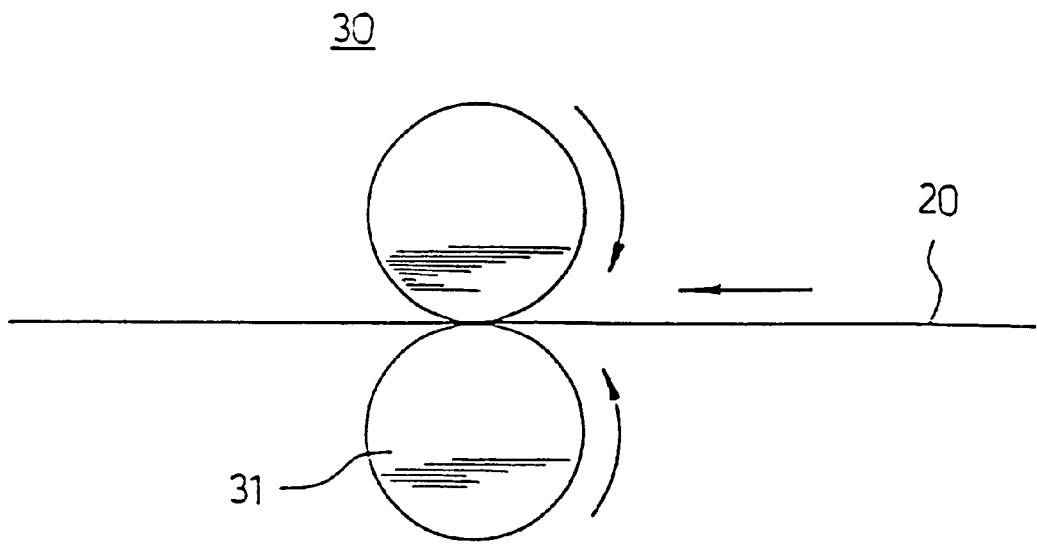
FIG. 3 shows that the iridescent film of the present invention is embossed by an embossing machine.
Figure 4:
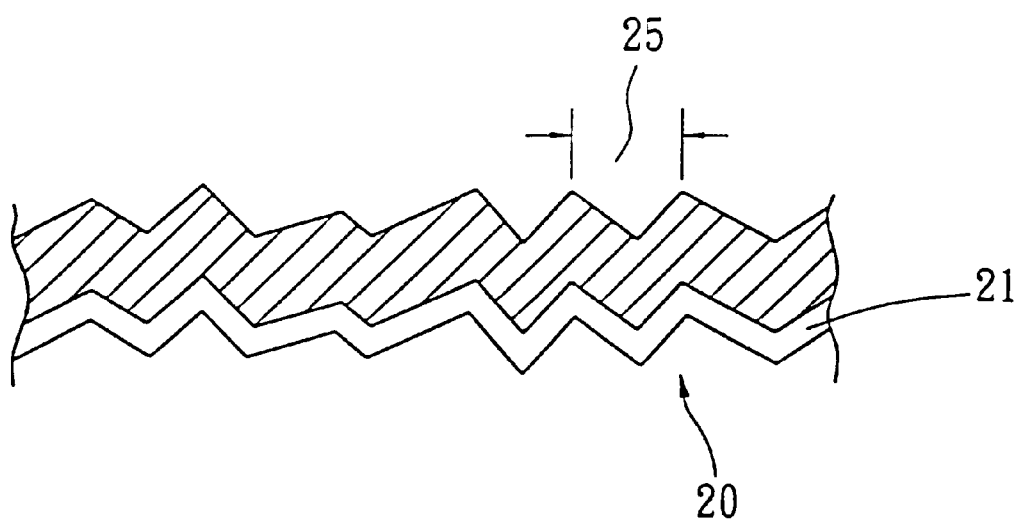
FIG. 4 is a cross-sectional view of the iridescent film of the present invention, showing the different reflection angle and pitches of the stripes.

FIG. 3 shows an embodiment of the present invention. By means of the above embossing machine 30, at least one surface of the iridescent film 20 is embossed with stripes having several different directions. The iridescent film includes multiple very thin films which are made of transparent plastic materials with different refractive indices. Therefore, at least one surface of the laminated iridescent film includes numerous stripes with different directions or pitches 25. The widths of the pitches 25 are within about 0.05–0.5 mm (as shown in FIG. 4). The above iridescent film can be made of transparent plastic materials such as polyethylene, polypropylene, polyvinyl chloride or polystyrene.

When seen in different directions, the iridescent film can create optical stripes with different phases. The optical stripes are created by a number of very thin films which are laminated to form the iridescent film. Very fine light points are evenly distributed in the optical stripes to create a unique and tender colorful vision.

What is claimed is:

1. Iridescent film with multidirectional variable optical stripes, comprising multiple very thin laminated films, the adjacent films being made of transparent plastic materials with different refractive indices, said iridescent film being characterized in that at least one surface of the laminated films has numerous stripes with different directions or pitches, whereby when seen in different directions, the stripes of the iridescent film can reflect different colors and shapes of bright stripes.

2. Iridescent film as claimed in claim 1, wherein the plastic material includes polyethylene, polypropylene, polyvinyl chloride or polystyrene.

3. Iridescent film as claimed in claim 2, wherein at least one backing material is attached to one face of the laminated films.

4. Iridescent film as claimed in claim 1, wherein the pitches are within 0.05–0.5 mm.

5. Iridescent film as claimed in claim 4, wherein at least one backing material is attached to one face of the laminated films.

6. Iridescent film as claimed in claim 1, wherein at least one backing material is attached to one face of the laminated films.

7. Iridescent film as claimed in claim 6, wherein the backing material is made of PP, PE, PVC, PET or PS sheet or film.

* * * * *